June 11, 1957 E. J. BALASH ET AL 2,795,699

ULTRAHIGH-FREQUENCY TUNER

Filed May 17, 1952 2 Sheets-Sheet 1

INVENTORS
Kenneth E. Farr &
Edward J. Balash.
BY
F. E. Browder
ATTORNEY

WITNESSES
Robert C. Baird.
R. G. Brodahl

INVENTORS
Kenneth E. Farr &
Edward J. Balash.
BY
F. E. Browder
ATTORNEY 2,795,699

ULTRAHIGH-FREQUENCY TUNER

Edward J. Balash, Sunbury, and Kenneth E. Farr, Paxinos, Pa., assignors to Westinghouse Electric Corporation, East Pittsburgh, Pa., a corporation of Pennsylvania Application May 17, 1952, Serial No. 288,474

2 Claims. (Cl. 250—40)

This invention relates to ultra-high frequency tuners such as are used, for example, as tuners in television receivers, or as converters for converting lower frequency television receivers for reception in the ultra-high frequency band.

Prior ultra-high frequency tuners have, in order to obtain adequate frequency coverage, involved complications making them unsuitable for mass production at low cost. In addition, it has been difficult in such tuners to obtain adequate selectivity and sensitivity, rejection of spurious signals, and a high signal-to-noise ratio.

This invention overcomes such disadvantages of prior tuners by providing simple, efficient tuning elements consisting of resonant co-axial lines using ganged slidable slugs slugs at corresponding ends for providing variable end capacity for tuning.

A feature of this invention is that the frequency range of such a tuning element is greatly extended by adding lumped capacity at its electrical center. Such lumped capacity has no effect on the resonance of the line under open circuit condition, but lowers the short-circuit resonance and thus extends the range of tuning, the open and short-circuit conditions representing the limits achieved by the variable end capacity.

Objects of this invention are to improve the performance of, and to reduce the cost of, ultra-high frequency tuners.

Another object of this invention is to extend the tuning range of a resonant transmission line.

The invention will now be described with reference to the drawings, of which:

Figures 1, 2:
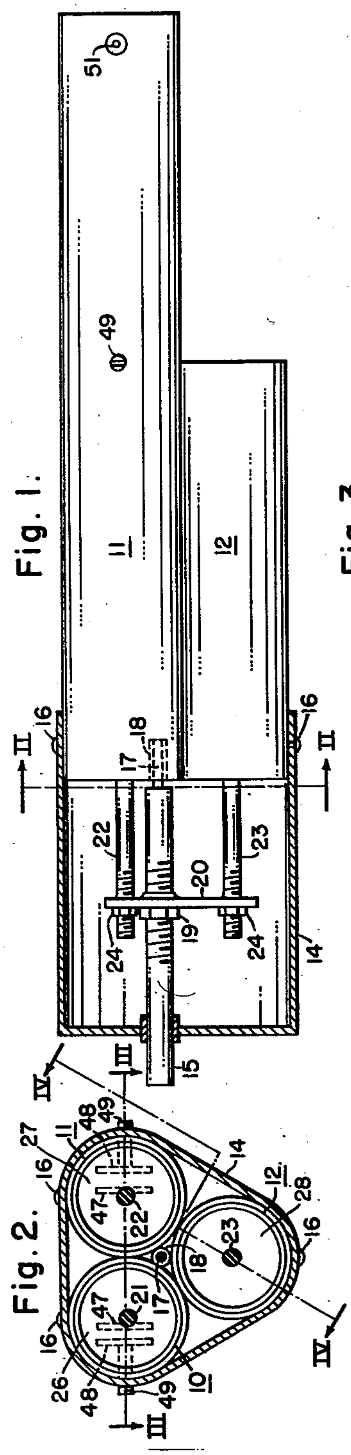
Fig. 1 is a side elevation, partially in section, of an ultra-high frequency tuner embodying this invention.
Fig. 2 is a sectional view along the lines 2—2 of Fig. 1.
Figure 3:
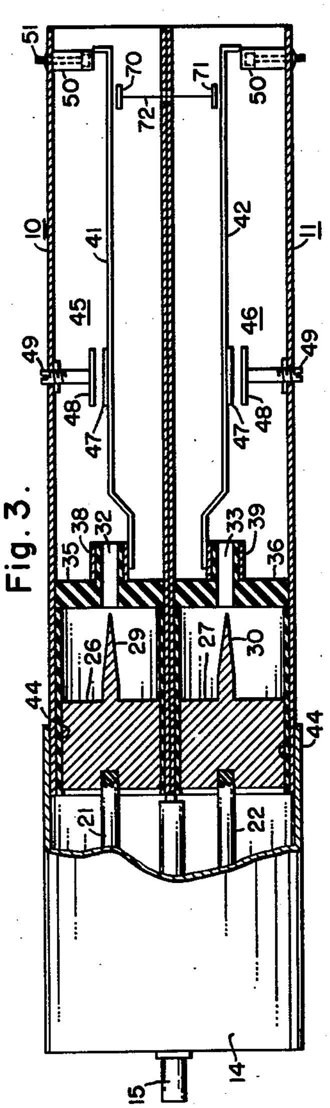
Fig. 3 is a sectional view along the lines 3—3 of Fig. 2.
Figure 4:
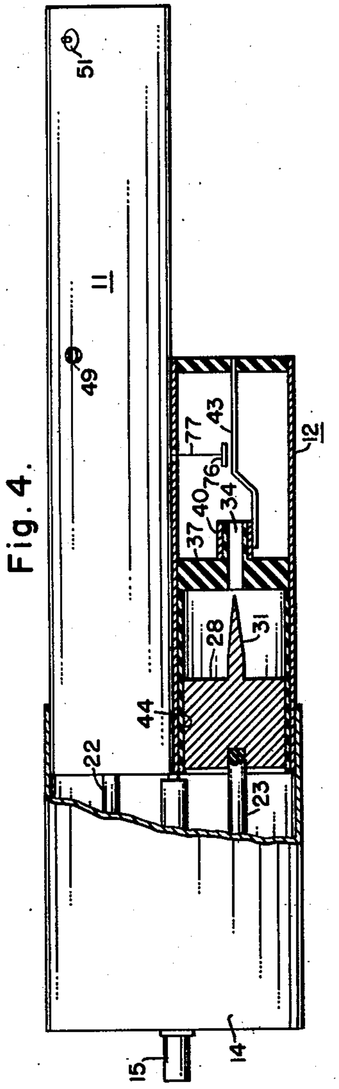
Fig. 4 is a sectional view along the lines 4—4 of Fig. 2.

The three co-axial transmission lines 10, 11 and 12 are nested together as illustrated by Figs. 1–4 of the drawings, with the adjacent outer surfaces of their outer conductors in contact. The line 10 is an antenna tuner; the line 11 is a mixer tuner, and the line 12 is an oscillator tuner. The lines 10 and 11 are half-wave resonant lines, and may, for example, tune identical frequency ranges of approximately 500 to 900 megacycles. The line 12 is a half-wave resonant line, and may tune a frequency range of approximately 544 to 944 megacycles for providing with the line 11 an intermediate frequency of 44 megacycles.

In this respect, tuned line 12, in conjunction with the lumped constants of the oscillator tube and socket, operates as a half-wave line.

The metal sleeve 14 having an inner open end, and an outer end closed except for an opening through which the tuning shaft 15 extends, extends around and in contact with the lines 10, 11 and 12 at their tuning ends, and is secured thereto by the rivets 16.

The inner end of the shaft 15 has a reduced diameter at 17 which rotates within the bearing 18, the outer surface of which contacts the adjacent outer surfaces of the outer conductors of the three co-axial lines, and is held in place thereby.

The tuning shaft 15 has a threaded intermediate portion which extends through a nut 19 secured to the metal plate 20 so that rotation of the shaft moves the plate 20 towards or away from the co-axial lines 10, 11 and 12 depending upon its direction of rotation. The phenolic rods 21, 22 and 23 for the lines 10, 11 and 12 respectively, have threaded outer ends which extend through the nuts 24 attached to the plate 20 so that movement of the plate by rotation of the tuning shaft, moves the rods into and out of the co-axial lines depending upon the direction of rotation of the tuning shaft.

The inner ends of the rods 21, 22 and 23 are preferably threaded into the outer ends of the brass tuning slugs 26, 27 and 28 respectively. The inner ends 29, 30 and 31 of the slugs 26, 27 and 28 respectively, have reduced diameters and are tapered so that they can enter the cylindrical openings 32, 33 and 34 respectively in the rings 35, 36 and 37 respectively, of polystyrene dielectric. The cylinders 44 of phenolic dielectric extend in position between the slugs and their respective outer conductors.

The brass sleeves 38, 39 and 40 extend around the inner ends of the openings 32, 33 and 34 respectively, and are contacted by corresponding ends of the inner conductors 41, 42 and 43 respectively, of the co-axial lines.

As the tuning slugs are moved towards and away from their associated sleeves, they increase and decrease respectively, the end capacity of the co-axial lines causing them to be tuned over their assigned frequency ranges. The end capacity is seen to be in effect a large fixed capacity in series with a small adjustable one, the latter providing the tuning.

For extending the low frequency range of the co-axial lines 10 and 11, the capacitors 45 and 46 are provided at the electrical centers of the lines for the highest frequency of operation. They move down the line electrically as the line is tuned to lower frequencies by the slugs. Each capacitor comprises a fixed plate 47 attached to its associated inner conuctor, a movable plate 48 attached to an adjusting screw 49 threaded into the outer conductor of its respective co-axial line. The outer ends of the screws 49 are slotted for providing rotation of the screws and adjustment of the plates 48 for tracking at the low frequency end of the tuning range.

The ends of the inner conductors 41 and 42 opposite their ends attached to the brass sleeves, are attached to the sleeves of conventional, high frequency, tracking capacitors 50 within which slugs are moved by screws 51 threaded in their respective outer conductors.

Figures 5, 6:
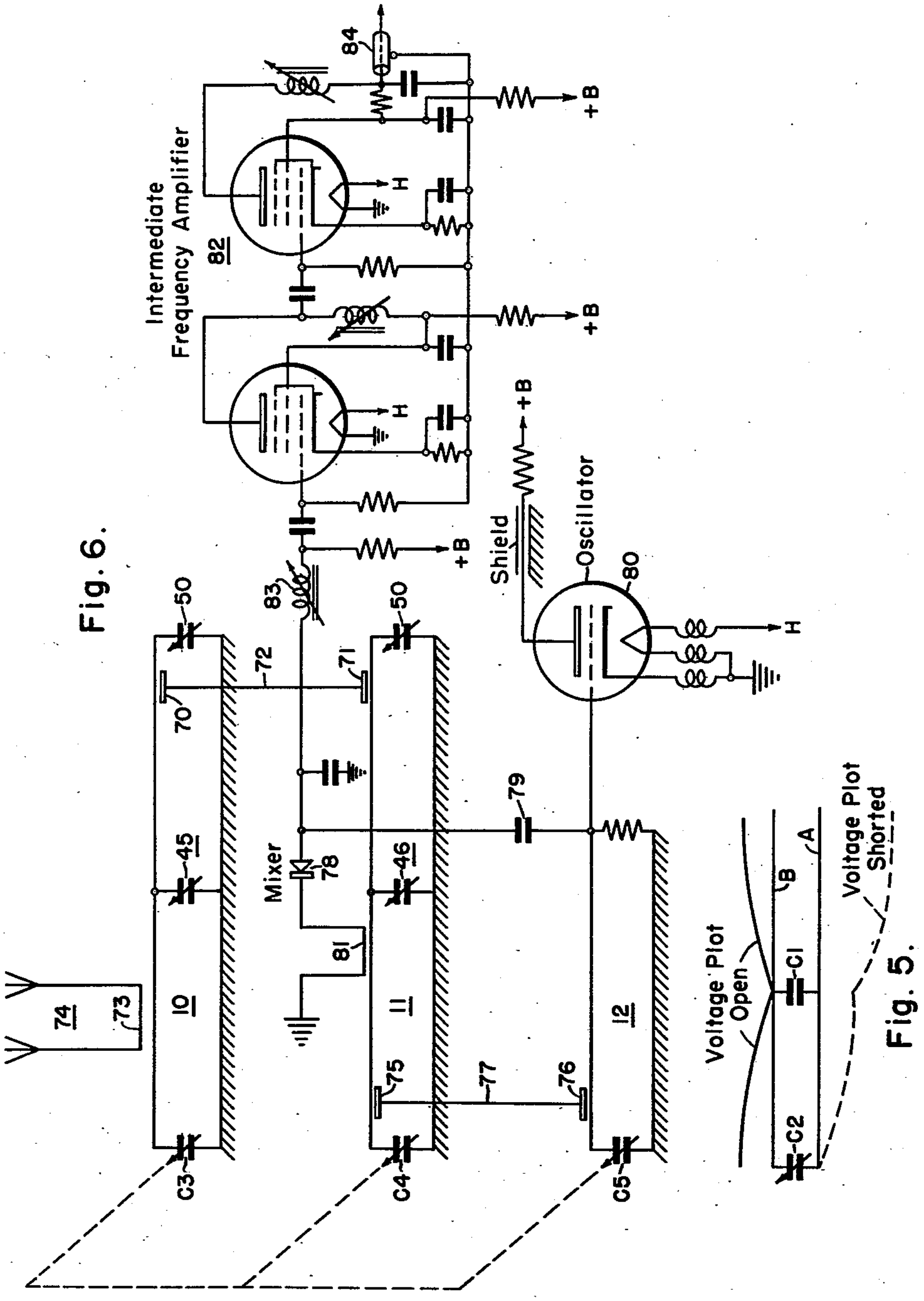
Fig. 5 is a diagrammatic view illustrating the characteristics of a resonant transmission line having a lumped capacity at its electrical center, and tuning capacity at one end according to this invention.
Fig. 6 is a circuit schematic of a television tuner embodying this invention.

Fig. 5 of the drawings illustrates the action of the lumped capacity at the center of each of the transmission lines 10 and 11. The line A represents an inner conductor, and the line B represents an outer conductor. The capacitor C1 is a lumped capacity at the electrical center of the transmission line formed by the conductors A and B. This of course, is true for the highest frequency of operation only. The capacitor C2 is an end tuning capacitor corresponding to each of the brass slugs and its associated brass sleeve, etc., of Figs. 1–4 of the drawings.

It is known that if a length of open transmission line is resonated at frequency $f$, and then one end of the line is shorted, the resonant frequency will be $f/2$. We have discovered that by adding lumped capacity at the electrical center of such a line, the range from open to short circuit can be made greater than 2 to 1. An actual test gave a range of 2.91 to 1. The lumped capacity has no effect on the line under open circuit condition but lowers the short-circuit resonant frequency thus extending the range of tuning. This action applies to parallel wire transmission lines as well as to co-axial ones.

Referring now to Fig. 6 of the drawings, the connection of the tuner described in connection with Figs. 1–5 of the drawings will be described. The co-axial lines 10 and 11 are capacitatively coupled together through the plates 70 and 71 and the wire 72 at their ends opposite the tuning slugs. The line 10 is inductively coupled at 73 to the antenna 74. The lines 11 and 12 are capacitatively coupled together through the plates 75 and 76 and the wire 77.

The crystal mixer 78 is connected at its positive side through the coupling capacitor 79 to the inner conductor of the co-axial line 12 and to the control grid of the oscillator tube 80. Cathode heaters are provided for each cathode, said heaters being connected to a suitable heater voltage supply H (not shown). The negative side of the crystal mixer is inductively coupled at 81 to the co-axial line 11. The positive side of the crystal mixer is also connected through the variable inductor 83 to the input of the conventional intermediate frequency amplifier 82, the output of which is connected through the low impedance link coupling 84 to the intermediate frequency amplifier strip in the associated television receiver.

The ganged variable capacitors are the end tuning capacitors comprising the brass tuning slugs and their associated brass sleeves, etc., of Figs. 1–4. The capacitors 45 and 46 are the lumped capacitors at the electrical centers of the transmission lines 10 and 11 previously described. The capacitors 50 are the high end tracking capacitors previously described.

In operation, the capacitors C3 and C4 tune identical frequency ranges from 500 to 900 megacycles at the same time the capacitor C5 tunes a frequency range from 544 to 944 megacycles. A portion of the oscillator energy is supplied to the crystal mixer 78 through the capacitative coupling thereto to heterodyne the incoming signal to an intermediate frequency of 44 megacycles. This intermediate frequency signal is amplified through the amplifier 82, and devlivered to the balance of the intermediate frequency amplifier in the receiver. For use as a convertor, with an oscillator range of 443–883 megacycles, the amplifier 82 would be tuned to 57 megacycle center frequency, and the output line fed to the antenna terminals of a conventional television set which is tuned to an appropriate frequency channel, depending upon the tuning of amplifier 82.

If a radio frequency amplifier stage between the antenna tuning and mixer stages, is desired, another co-axial line similar to the line 10 to 11 can be provided in accordance with our teachings herein for tuning such additional stage.

An inductive shunt on the line at a point which is the electrical center for the highest frequency of operation effectively raises the high frequency end without affecting the low frequency end, thus increasing the range in the opposite sense from that done by the condenser. By placing a capacitor on the line in this manner, the natural resonant frequency is raised, since the inductance is lowered. This in effect electrically shortens the line at the high frequency end.

While one embodiment of the invention has been described for the purpose of illustration, it should be understood that the invention is not limited to the exact apparatus and arrangement of apparatus illustrated as modifications thereof may be suggested by those skilled in the art without departure from the essence of the invention.

I claim as my invention:

1. A tuner comprising an open coaxial line having an inner conductor with an end which terminates short of the outer conductor at one end of the outer conductor, means for tuning said line comprising a metal slug movable within said outer conductor at said end thereof, towards and away from said end, and a capacitor member connected between said inner and outer conductors at the electrical center of said line, said electrical center being determined for the highest frequency of operation of said line, said capacitor member being operative to extend the low frequency resonance of said line.

2. A tuner comprising a plurality of coaxial lines having inner conductors with corresponding ends spaced from the corresponding ends of the respective outer conductors, said ends of said inner conductors having attached thereto cylindrical metal sleeves coaxial with their respective inner conductors, cylindrical metal slugs movable within said corresponding ends of said outer conductors and coaxial therewith, said slugs having inner extensions having smaller diameters than the openings within said sleeves, rods of electrical insulation attached to the outer ends of siad slugs, a tuning shaft, means so connecting said shaft and said rods that rotation of said shaft in one direction or the other moves, through said rods and slugs, said extensions towards or away from said sleeves, and a capacitor member connected between said inner and outer conductor at the electrical center of the outer conductor of one or more of said lines, said electrical center being determined for the highest frequency of operation of the outer conductor of one or more of said lines, said capacitor member being operative to extend the low frequency resonance thereof.

References Cited in the file of this patent

UNITED STATES PATENTS

| | | |
|---|---|---|
| 1,947,584 | Deutscher | Feb. 20, 1934 |
| 2,066,674 | Dunmore et al. | Jan. 5, 1937 |
| 2,223,835 | Smith | Dec. 3, 1940 |
| 2,262,365 | Kinn | Nov. 11, 1941 |
| 2,304,377 | Roberts | Dec. 8, 1942 |
| 2,358,462 | Mahren | Sept. 19, 1944 |
| 2,384,504 | Thias | Sept. 11, 1945 |
| 2,475,198 | Reinschmidt | July 5, 1949 |
| 2,486,863 | Mitchell | Nov. 1, 1949 |
| 2,496,322 | Wallin | Feb. 7, 1950 |
| 2,513,761 | Tyson | July 4, 1950 |
| 2,530,089 | Smith | Nov. 14, 1950 |
| 2,589,739 | Shepherd | Mar. 18, 1952 |
| 2,617,038 | Russell | Nov. 4, 1952 |
| 2,705,778 | Rubin | Apr. 5, 1955 |

FOREIGN PATENTS

| | | |
|---|---|---|
| 166,778 | Switzerland | Feb. 16, 1934 |